United States Patent [19]

Winchip et al.

[11] Patent Number: 5,272,443
[45] Date of Patent: Dec. 21, 1993

[54] CHATTER AND PROFILE MEASURING USING CAPACITOR SENSORS

[75] Inventors: Wade A. Winchip, Bettendorf; Michael A. Ringle, Davenport, both of Iowa

[73] Assignee: Aluminum Company of America, Pittsburgh, Pa.

[21] Appl. No.: 872,912

[22] Filed: Apr. 22, 1992

[51] Int. Cl.[5] .............................. G01R 27/26
[52] U.S. Cl. ................... 324/662; 324/686; 73/105; 29/407
[58] Field of Search .............. 324/662, 679, 686, 690; 73/105; 29/407

[56] References Cited

U.S. PATENT DOCUMENTS

| | | | |
|---|---|---|---|
| 4,814,691 | 3/1989 | Garbini et al. | 324/661 |
| 4,849,916 | 7/1959 | Abbe et al. | 73/105 |
| 4,910,453 | 3/1990 | Abbe et al. | 324/690 |
| 5,012,196 | 4/1991 | Baranski | 324/690 |
| 5,065,103 | 11/1991 | Slinkman et al. | 324/662 |
| 5,189,377 | 2/1993 | Rhoades et al. | 324/662 |

FOREIGN PATENT DOCUMENTS

| | | | |
|---|---|---|---|
| 0004757 | 10/1979 | European Pat. Off. | 324/662 |
| 0595669 | 2/1978 | U.S.S.R. | 324/690 |
| 1303807 | 4/1987 | U.S.S.R. | 73/105 |

*Primary Examiner*—Kenneth A. Wieder
*Assistant Examiner*—Glenn W. Brown
*Attorney, Agent, or Firm*—Elroy Strickland

[57] ABSTRACT

A method and apparatus for measuring chatter marks on a metal workpiece. The method includes first removing gross buckle or curvature in the workpiece by clamping the same in the device having an elongated jaws and in a manner that locates a portion of the workpiece outside of the jaws so that an elongated portion of the workpiece is available for inspection by capacitive sensors. The sensors are located adjacent at least one surface of the elongated portion of the workpiece, the sensor and workpiece forming an electrical capacitor when appropriate potentials are applied to the sensor and workpiece. The sensors are now moved along the surface in the elongated direction of the workpiece to detect chatter marks on the surface.

6 Claims, 5 Drawing Sheets

DIRECTION OF SCAN FOR MEASUREMENT →

CHATTER AND PROFILE MEASURING USING CAPACITOR SENSORS

BACKGROUND OF THE INVENTION

The present invention relates generally to rolling mills and particularly to the detection of instability in a mill that results in a phenomenon known as "chatter".

Individual stands of a rolling mill comprise a rigid housing and a stack of rolls rotationally supported in the housing by bearing chocks. Chatter is vibration occurring within a given stand and housing, which vibration may include a generally up-and-down linear motion of one or more of the rolls, a shifting of the work rolls in a stand in the direction of rolling and in the opposite direction, a torsional or rotational displacement of the rolls, or any combination of these motions.

Roll vibration results in visual parallel marks being rolled into the upper surface of the workpiece being rolled, the marks extending crosswise of the workpiece, i.e., crosswise to the direction of rolling. The parallel marks are a general waviness in the workpiece surface, which waviness distorts the reflection of light from the surface and distracts from its otherwise mirror-like surface finish. In addition, chatter marks are typically cyclic, with wavelengths of less than four inches and amplitudes less than 0.001 inch.

Further, coolants unevenly applied to the rolls of a rolling mill during the process of reducing the thickness of a workpiece can leave unwanted parallel marks on a surface of the workpiece. Such marks are uneven surface variations that effect the aesthetics of an otherwise bright surface.

Presently, the measurement of chatter and coolant marks on rolled strip has been subjective, based upon the impressions and opinions of experienced viewers, using the unaided eye, and influenced by ambient light and background reflections.

Chatter can also be a cyclic change in strip thickness or gauge. Such a deviation cannot be detected by the human eye.

Attempts have been made to objectively measure chatter by using small (six inch) samples of metal material and moving them individually past a contacting probe to measure the profile of the samples' surfaces. The samples were too small to provide an adequate analysis of surface conditions, and the probe, as a surface contacting device, was sensitive to surface contamination. Also, the probe did not provide data which related to what the human eye can see.

Another condition of a rolled metal strip, sheet and/or plate that requires control in the rolling process is known as the "profile" of the sheet thickness in the direction crosswise to the rolling direction. It is necessary to maintain profile as close as possible to a target value to guarantee good performance of the metal in finishing operations, such as cold rolling and leveling. Profile measurement is difficult because of the accuracy and precision required. The control of profile to $\pm 0.01\%$ on a 0.125 inch metal thickness requires the measurement to be repeatable within $\pm 0.0000125$ inch, which is in the neighborhood of surface roughness. If high performance contacting sensors are used, they are often degraded by the minute peaks and valleys in the rolled surface. Precise, non-contacting sensors lack the measurement range to track surface flatness for the full width of a metal sheet, i.e., any buckle or curvature in the sheet requires such sensors to move out of sensing range. Most non-contacting, analog-type probes have an accuracy of one part in 4,000. Therefore, if the metal flatness deviates by more than 0.1 inch, $\pm 0.0000125$ inch measurement is out of range for such probes.

SUMMARY OF THE INVENTION

The present invention solves the above problems by first using a long clamping device having elongated rigid jaws, such as jaws that might be found in a large, elongated vise. The jaws have flat, planar surfaces so that when a sample of metal is clamped between such jaws any general curvature or gross buckle in the sample is made substantially perfectly flat. A portion of the sample mounted in the jaws extends outside of the jaws so that a sensor probe can be mounted adjacent a surface of the extending portion for scanning the surface. Further, the extension is elongated in the direction of the elongated jaws such that a substantial amount of sample surface is available for inspection and analysis by the scanning probe and associated electronics.

The probe is mounted on a precision motorized slide for travel over the sample surface. Such a precision slide avoids introducing measurement errors due to the probe traveling in an uneven, unlevel path. The sensor of the probe is a non-contact capacitance sensor, the inspecting surface of which, and that of the sample, forming an electrical capacitor. Since the sensor moves in a perfectly flat plane, any change in the output of the sensor is the result of changes in the height of the sample surface relative to the sensor.

In addition, the sensor can be sampled a multiple of times per interval of sensor travel to provide raw data that is then numerically differentiated twice to arrive at a single number for the "curvature" of each interval or continuously differentiated using multiple sensors and supporting electronics, which interval includes at least a portion of a chatter mark on the sample surface. Further, the sensor and appropriate electronics, using numerical methods, such as the Fourier transform or autocorrelation, define the spacing of the chatter marks and thus the source of the marks.

The sample can also be positioned in the clamping device in a manner that allows the sensor to measure the profile of the sample. If two sensors are used respectfully on opposed surfaces of the sample, "gauge chatter" can be measured by appropriately combining the outputs of the two sensors.

Preferably, the sensors are mounted on a C-type frame moveable about a pivotal location so that the sensor can be adjusted to the angle of the sample extending from the clamping device.

It is therefore an objective of the present invention to measure large samples of metal for surface chatter and coolant marks in an objective repeatable manner using sophisticated analyzing electronics receiving the output of a capacitor sensor. Such analyzing provides a precise indication of the nature of the chatter and, therefore, its probable source.

Another objective of the invention is to provide precise measurements of sheet or plate profile and any gauge chatter that may exist in the sheet or plate.

BRIEF DESCRIPTION OF THE DRAWINGS

The objectives and advantages of the invention will be better understood from consideration of the following detailed description and the accompanying drawings in which.

A PREFERRED EMBODIMENT OF THE INVENTION

Figure 1:
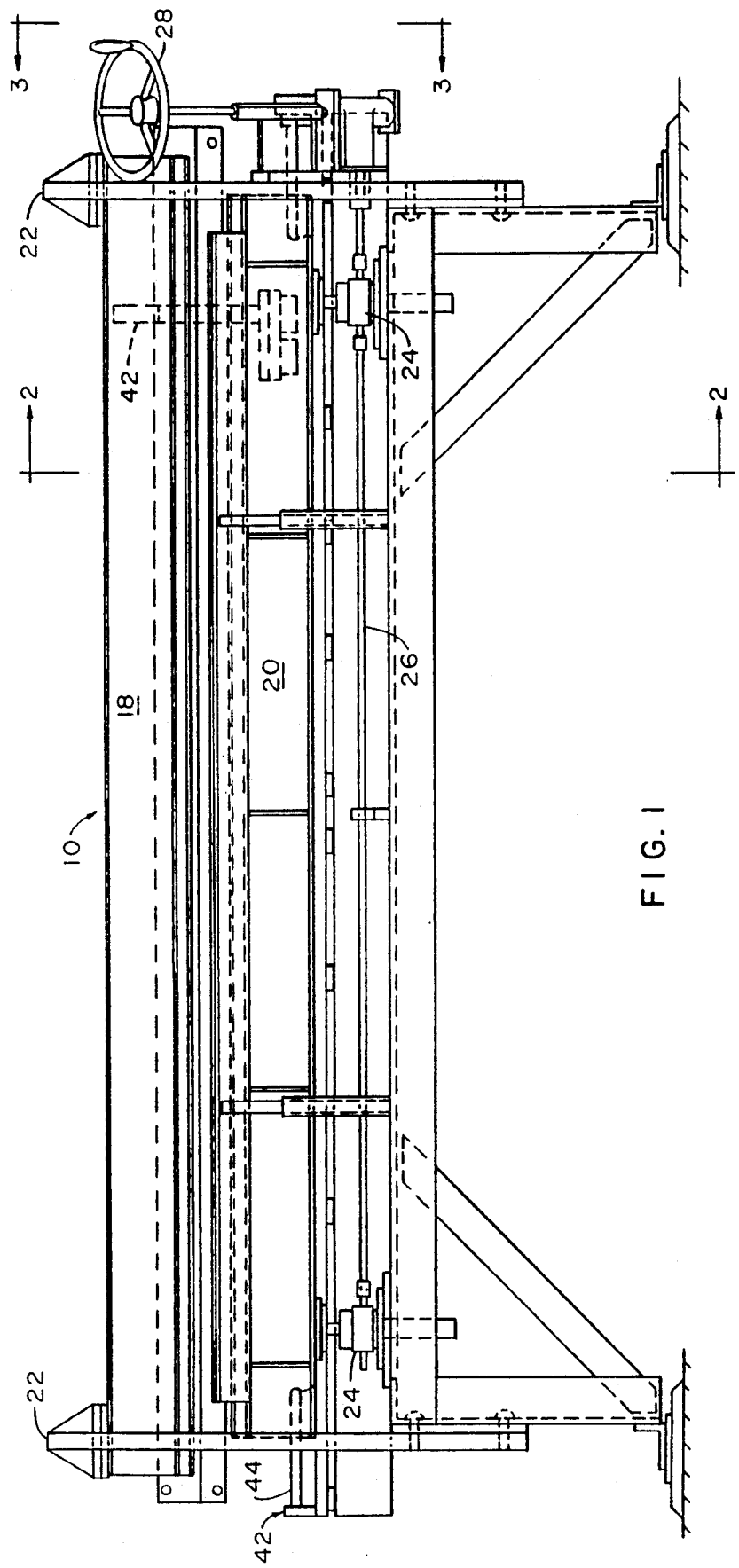
FIG. 1 is a front elevational view of a clamping device and sensing slide of the invention.
Figure 2:
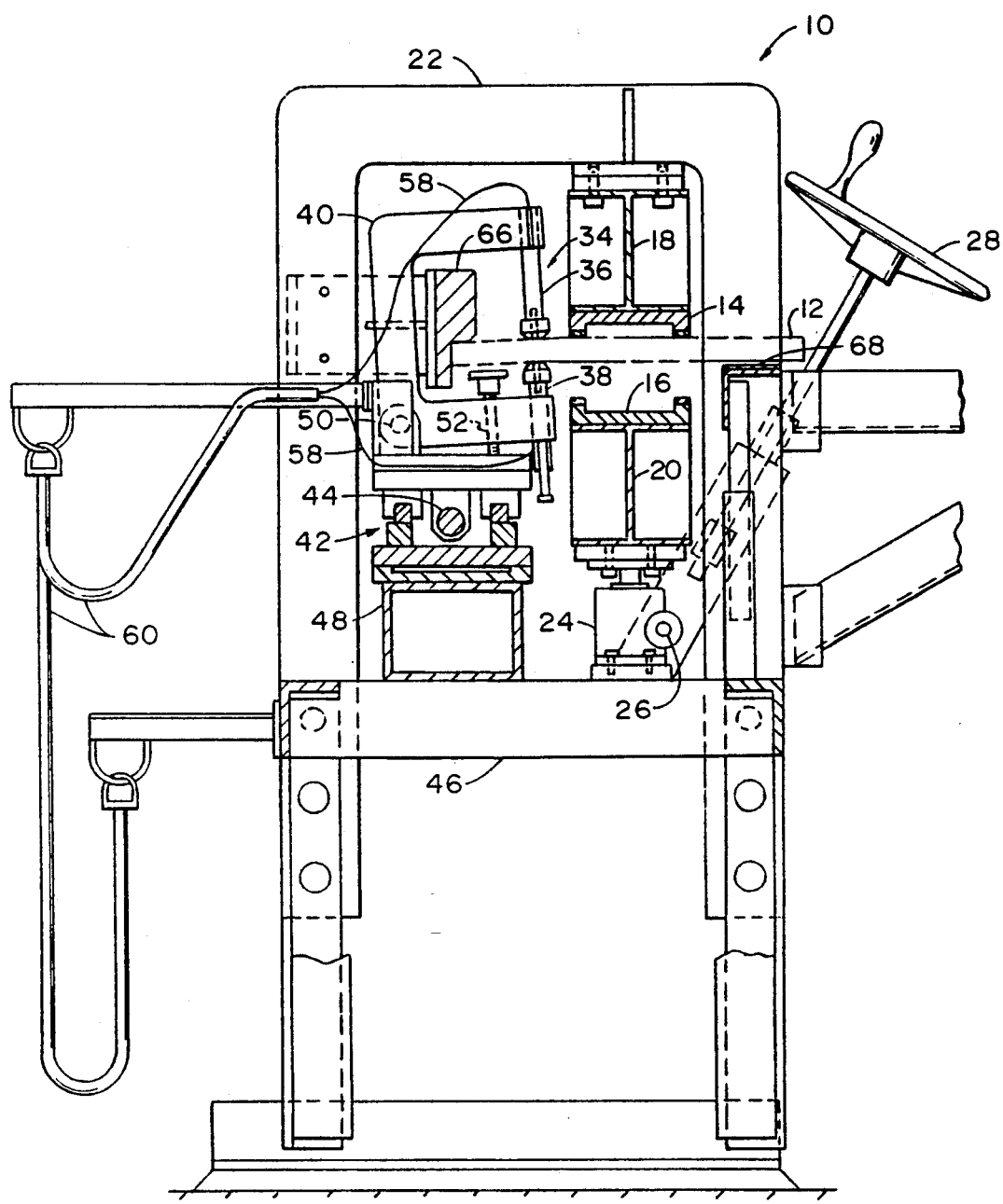
FIG. 2 is a cross-sectional view of the clamping device and slide of FIG. 1 taken along lines 2—2 in FIG. 1, with capacitive sensors on the slide being shown in elevation.
Figure 2A:
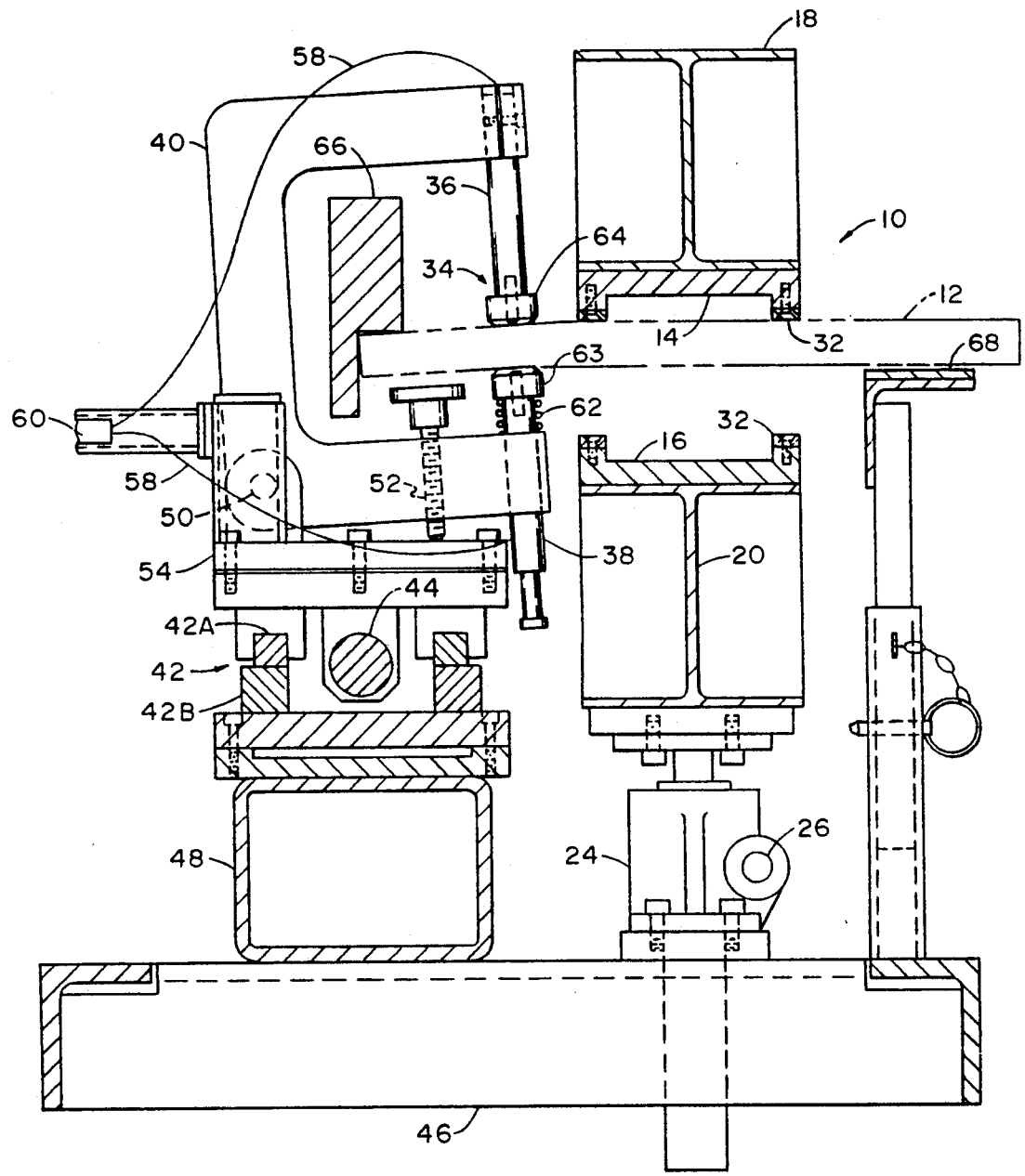
FIG. 2A is an enlarged view of FIG. 2.
Figure 3:
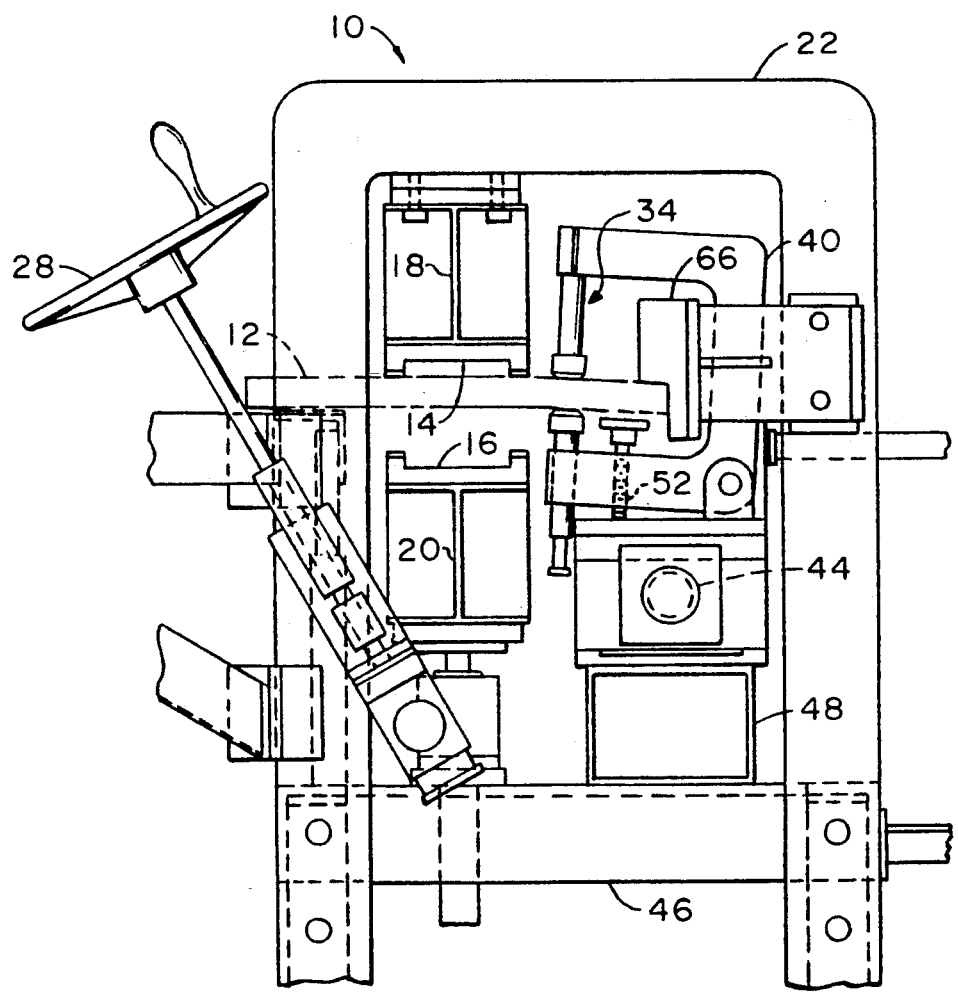
FIG. 3 is an end view of the apparatus of FIGS. 1, 2, and 2A.

Referring now to FIGS. 1 to 3 of the drawings, an elongated clamping device 10 is shown for flattening a relatively flat metal sample or workpiece 12 (shown in phantom) in FIGS. 2, 2A, and 3, i.e., any gross curvature or buckle in sample 12 is removed when 12 is tightly clamped in device 10.

More particularly, device 10 comprises elongated clamping jaws 14 and 16, as best seen in FIGS. 2 and 2A, the jaws each having a shallow U-shape cross-section. The entire lengths of the jaws are suitably attached respectively to rigid, elongated upper and lower eye beams 18 and 20, the eye beams providing the jaws with the rigidity of the beams. The upper eye beam is shown fixedly attached to rigid arbors 22, while the lower eye beam is secured to two screw jacks 24, as seen in FIG. 1, located near the ends of the lower beam. The jacks are operated by an elongated threaded rod 26 extending between the jacks (see again FIG. 1) and the lower end of a hand wheel and shaft 28 threadably engaging shaft 26.

The jaws 14 and 16 of clamping device 10 provide rigid, even, level surfaces the entire length of their elongated dimension such that when metal sample 12 is tightly clamped between them, any gross buckle or curvature in the sample is removed. Since the jaws are rigid and preferably made of hard tool steel, the faces of the jaws that engage the sample are shown provided with pads 32 of a softer material, such as cotton cloth, so that the jaw faces and edges do not mark the sample.

Sample 12 is secured between jaws 14 and 16 such that a portion of the sample extends outside of the jaw area, as seen in FIGS. 2, 2A, and 3.

Arbors 22, in addition, contain a sensing probe, generally designated by numeral 34 in FIGS. 2 and 2A, for scanning and inspecting at least one of the surfaces of sample 12 extending from the clamping jaws. The size of the sample is such that its "width" is sufficient to span the shallow U of the jaws and extend beyond the jaws to the area of a sensing probe 34, while its "length" extends the substantial length of the clamping device including elongated jaws 14 and 16. In this manner, a substantial "measuring distance" is provided for obtaining surface data from probe 34 that will be indicative of surface chatter.

Figure 4:
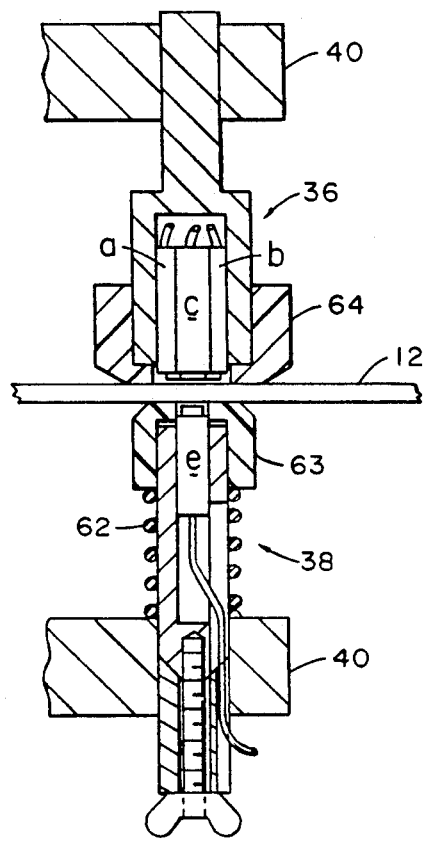
FIG. 4 is an elevation view of a cluster of sensor probes that are employed in the invention, with supporting structure being depicted in section.

Probe 34 is shown in FIGS. 2, 2A, and 3 comprising upper and lower tubular probe devices 36 and 38, respectively, mounted above and below the extension of sample 12 by a C-frame 40. Preferably, the upper probe is comprised of cluster of four sensors a, b, c, and d (FIGS. 4 and 5), while the lower probe comprises one sensor e. FIG. 4 shows enlarged sections of upper and lower probe bodies 36 and 38. Details of the probes and sensors are discussed hereinafter.

The C-frame is mounted on a precision motorized slide system generally designated by numeral 42. The slide system includes an upper slidable portion 42A and a lower fixed portion 42B, these portions extending into the plane of the paper in FIGS. 2, 2A, and 3. The mutually engaging surfaces of 42A and 42B are precision machined to provide perfectly flat surfaces so that sensor probe 34 can gather surface information without the slide introducing errors to sensor measurements.

The upper portion 42A of the slide is moved along the longitudinal extent of lower slide 42B by a threaded traversing rod 44; the rod is driven by a suitable motor, not shown. A slide system that has been found suitable for the purposes of the present invention is manufactured by Daedal, a division of Parker Hannafin Company in Harrison City, Pa.

Slide system 42 is fixedly mounted on cross beams 46 of arbors 22 by an elongated, rectangular, hollow member 48, as best seen in FIGS. 2, 2A, and 3.

C-frame 40 is preferably pivotally mounted on slide 42 at a location 50 of the frame, which location is at the lower rear portion of the frame. This allows the frame to be adjusted to the angle of the sample portion extending from clamping jaws 14 and 16 of device 10. An adjustment screw 52 is provided for this purpose, the screw being threadably located in the lower arm of the C-frame. As best seen in FIG. 2A, adjustment is made by the screw engaging the planer surface of a support platform 54.

Figure 6A:
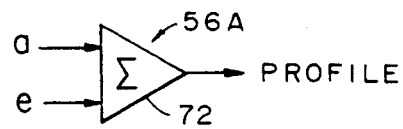
FIGS. 6A and B schematically the processing of signals from the sensors.

The four sensors of probe 36 and the one sensor of probe 38 are electrically connected to electronic circuitry 56A and 56B, as generally designated in FIGS. 6A and B respectively, by suitable insulated cables 58. In FIG. 2, the cables are housed in a hose 60 to protect the cables, the hose (and cables) having a substantial loop to permit the probes to travel the distance of slide 42 in relation to electronic circuitry, which is preferably stationary.

As seen in FIGS. 2A and 4, a coil spring 62 is located between a movable plastic cap 63, located at the sensing end of lower probe 38, and the lower arm of C-frame 40. Spring 62 loads cap 63 against sample 12 and allows the sample to control movement of C-frame 40 when the probes traverse the sample. A similar cap 64 is fixed on the end of the upper probe 36. As seen in FIG. 4, both caps space the sensing ends of the probes from the surface of sample 12.

The operation of the above apparatus, as thus far described is as follows. The jaws 14 and 16 of clamping 10 are opened (if closed) by manually operating hand wheel 28. The wheel rotates threaded rod 26 of the jacks. Similarly, upper and lower sensing probes 36 and 38 are positioned such that there is ample clearance between them for receiving a relatively flat workpiece (12) of rolled metal having chatter marks. The workpiece can be a sample cut from a coil of aluminum sheet, for example, in an elongated form to extend the substantial distance of the clamping device and sensor slide.

The sample workpiece 12 is now inserted between the open jaws of the clamping device 10 from the front of device 10 and moved to the rear of device 10 until the leading edge of the sample abuts against an elongated stop means 66 located behind the sensing probes. The stop means extends the substantial distance of the clamping device and provides a true reference surface for aligning the elongated sample in the clamping device. Preferably, the sample engages a ledge of the stop means that is effective to cause a slight bending of the sample, as seen in FIG. 2, when clamps 14 and 16 are tightened against the sample. This serves to further flatten the sample.

With sample 12 properly positioned in the clamping device and resting on a table or shelf means 68 (see FIG. 2A), hand wheel 28 is rotated to move lower jaw 16 toward upper fixed jaw 14 via jacks 24. The hand wheel is operated until the jaws tightly engage the sample to remove any general curvature in the sample if the sample is not flat. The jaws, of course, can be operated by means other than a hand wheel.

Sensing probes 36 and 38 are now moved to positions in close proximity of the surfaces of the portion of the sample extending between stop 66 and jaws 14 and 16, only caps 63 and 64 contacting the sample surfaces. The breadth of the face of each sensor a through e (FIGS. 4 and 5) forms electrical capacitors with the sample when appropriate electrical potentials are applied between the probes and sample. Each sensor has a limited sensing and measuring range. The pivoting C-frame, the positioning of the probes within the frame, and the contact between the plastic caps and sample surfaces allows one to locate each probe in the center of its measuring range so that the sensor operates in a precise manner to provide precise measurements of sample surfaces.

A sensing probe that has been found suitable for the purposes of the invention is made by Capacitec, Inc., 87 Fitchburg Road, Ayer, Mass.

Precision slide 42 is now operated to move probes 36 and 38 along the upper and lower surfaces of sample 12 by rotation of traverse rod 44. The four sensors of the upper probe scans the upper surface of 12 and measures chatter marks on the upper surface, in moving along the surface, the heights of the chatter marks in relation to the nominal surface of the sample altering the capacitance of the sensing mechanism that is provided by the upper sensors and the upper sample surface. Generally, chatter in a rolling mill affects equally the upper and lower surfaces of the material being reduced to thickness in the mill. Only the upper sensors of 36 are, therefore, needed to sense and measure chatter marks.

Figure 5:
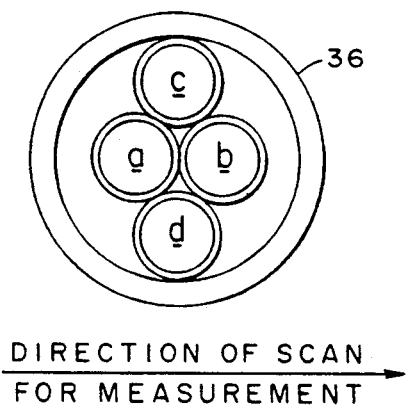
FIG. 5 is a bottom view of the sensor cluster of FIG. 4.
Figure 6B:
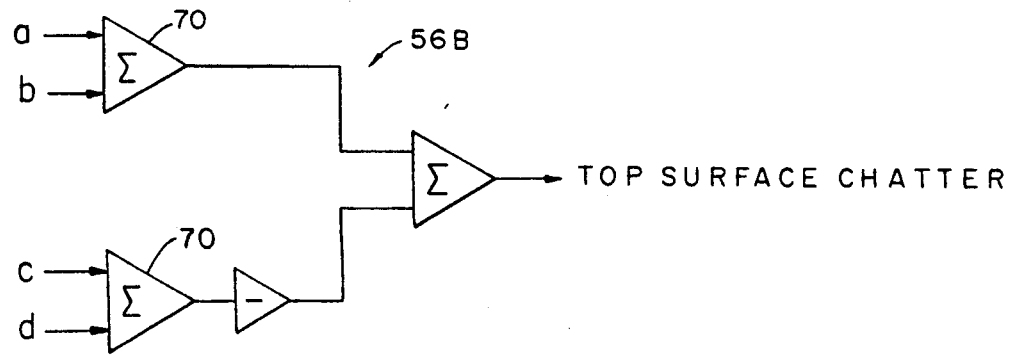

The changing capacitance of the sensing mechanism caused by the chatter marks is converted to a voltage signal by the sensors of 36, which signal is conducted to operational amplifiers 70 of circuitry 56B (FIG. 6B). The amplifiers produce outputs that represent the curvature of the chatter marks. If the four sensors are positioned to provide respective signals at three respective points a, b, and c on an arc or curve (not shown) on the surface of 12, a, b, and c representing three of the four sensors, a minus b (a−b) will equal the slope of that portion of the arc or curve, while b minus c (b−c) is the slope of the second portion. The amplifiers combine the two equations in the form of a−b−(b−c), which can be stated as a−2b+c, which comprises two differentiations to arrive at a single number for "curvature" at equally spaced intervals. The fourth sensor d provides a signal duplicating c. This allows a and b to be closely nested. Close nesting of the sensor allows them to sense closely spaced chatter marks. The segments of the curvature from a to b and from b to c can now be shorter, which allows sensing of short wavelength chatter. In FIG. 5 of the drawings, scanning motion of the probe 36 is in a direction from left to right. Chatter marks on the surface of 12 then appear as lines perpendicular to scan.

"Curvature" is thus the second derivative of raw surface height signals and relates directly to the way the surface of 12 distorts light and the way a viewer sees chatter with the naked eye. Further, "curvature" tends to highlight short wavelength anomalies while attenuating long wavelength effects, such as a slowly changing gauge along or profile across the direction of workpiece travel in the rolling process.

Values of curvature calculated along a length of say a one hundred inch workpiece or sample can be further analyzed by other mathematical methods to better define the spacing of the marks so that sources of the marks in the rolling process can be determined. Such methods include the Fourier transform or auto-correlation that can be in software form and used in a general purpose digital computer.

From the above discussion, it is readily apparent that only one probe is needed to measure chatter. If chatter appears on both surfaces of a sample, a second probe (38) can be used.

The second, lower probe 38 can also be used in combination with upper probe 36 to provide measurements of sample thickness. In this case, the outputs from the probes are summed by an amplifier 72 in FIG. 6A, such summations representing changes in the gauge (thickness) of the sample. Changing thickness in the direction of rolling is another type of chatter if the changes are cyclic and the wavelengths are less than about four inches. If the measured sample is cut from a coil of metal so that its elongated dimension is in a direction perpendicular to the rolling direction, the gauge in this direction is known as "profile." As the sensing probes travel the elongated dimension, a changing electrical capacity of the sensing mechanism is a measure of profile. With such knowledge, corrections can be made in the rolling mill to provide sheet and/or plate with a constant, uniform profile.

While the invention has been described in terms of preferred embodiments, the claims appended hereto are intended to encompass all embodiments which fall within the spirit of the invention.

What is claimed is:

1. A method of measuring chatter on at least one surface of a rolled metal sheet or plate having substantial length and width dimensions comprising:
    flattening gross buckle or curvature that might be in the sheet or plate;
    maintaining the flatness of the sheet or plate;
    locating at least one sensor adjacent a surface of the sheet or plate and without contacting the surface, said sensor and sheet or plate forming an electrical capacitor;
    applying an electrical potential across said capacitor;
    moving said sensor along and parallel to the sheet or plate in a precision plane;
    sampling sensor output at a rate that produces multiple data samples of measurement per interval of sensor travel distance; and
    differentiating said data samples twice to arrive at a number for the curvature of the surface of each interval travelled by the sensor.

2. The method of claim 1 including:
    using sensor measurements to quantify marks on the workpiece surface that are the result of coolants unevenly applied to the rolls of a rolling mill employed in producing the workpiece.

3. The method of claim 1 including using a cluster of side-by-side sensors to increase the resolution of the sensing process.

4. A method of measuring rolling mill chatter marks on a surface of a relatively large metal workpiece comprising:
   flattening gross buckle or curvature in said workpiece in a manner that locates an exposed portion of the large workpiece in a position for inspection by at least one sensor capable of sensing chatter marks on the surface of said exposed portion facing the sensor;
   maintaining the flatness of said workpiece;
   locating a sensor adjacent said exposed portion and without contacting the surface of the same, said sensor and workpiece forming an electrical capacitor;
   applying an electrical potential across said capacitor; and
   moving said sensor in a precision plane along and parallel to the surface of the exposed portion in an elongated direction of the workpiece to detect chatter marks on the said surface.

5. The method of claim 4 including:
   locating the sensors in a support structure; and
   providing said structure with a pivoting capability that permits the sensors to adjust to the position of the elongated portion of workpiece available for inspection.

6. Apparatus for sensing the presence of chatter marks on the surface of elongated and relatively wide rolled metal workpieces comprising:
   means for clamping an elongated, wide workpiece in an elongated clamping device to remove gross buckle or curvature in the workpiece, with an elongated portion of the workpiece extending from said clamping means for inspection by a sensor;
   means for mounting a sensor adjacent the elongated portion of said workpiece extending from the clamping device;
   said sensor and workpiece forming an electrical capacitor;
   a precision plane located adjacent the elongated portion of the workpiece;
   means for moving the sensor along said precision plane and along the workpiece portion extending from the clamping means; and
   an operational amplifier electrically connected to receive and sample the output of the sensor during intervals of travel distance of the sensor and to differentiate sample data in a manner providing a number indicative of the curvature of each surface interval travelled.

* * * * *